United States Patent
Goldman et al.

(10) Patent No.: US 9,676,475 B2
(45) Date of Patent: Jun. 13, 2017

(54) SYSTEM AND METHOD FOR MAINTAINING AIRCRAFT GROUND TRAVEL SPEED AND DIRECTION

(75) Inventors: Joseph Goldman, Pikesville, MD (US); Rodney T. Cox, North Plains, OR (US); Isaiah W. Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 690 days.

(21) Appl. No.: 13/603,393

(22) Filed: Sep. 4, 2012

(65) Prior Publication Data

US 2013/0200209 A1 Aug. 8, 2013

Related U.S. Application Data

(60) Provisional application No. 61/530,925, filed on Sep. 2, 2011.

(51) Int. Cl.
| | | |
|---|---|---|
| *B64C 25/40* | (2006.01) | |
| *G05D 1/00* | (2006.01) | |
| *G08G 5/00* | (2006.01) | |
| *G08G 5/06* | (2006.01) | |

(52) U.S. Cl.
CPC ......... *B64C 25/405* (2013.01); *G05D 1/0083* (2013.01); *G08G 5/0021* (2013.01); *G08G 5/065* (2013.01); *G08G 5/0026* (2013.01); *Y02T 50/823* (2013.01)

(58) Field of Classification Search
CPC .. B64C 25/405; G05D 1/0083; G08G 5/0021; G08G 5/065; Y02T 50/823
USPC .................................. 244/103 R, 50
See application file for complete search history.

(56) References Cited

U.S. PATENT DOCUMENTS

| | | | |
|---|---|---|---|
| 3,807,664 A * | 4/1974 | Kelly et al. ............ 244/50 |
| 4,490,793 A | 12/1984 | Miller | |
| 6,657,334 B1 | 12/2003 | Edelson | |
| 6,838,791 B2 | 1/2005 | Edelson | |
| 7,116,019 B2 | 10/2006 | Edelson | |
| 7,226,018 B2 | 6/2007 | Sullivan | |

(Continued)

OTHER PUBLICATIONS

Rakowski et al, "Proceedings of the Sixteenth International Symposium on Aviation Psychology", 44-49, Dayton, OH, Wright University, 2009.

*Primary Examiner* — Brian M O'Hara
*Assistant Examiner* — Keith L Dixon (57) ABSTRACT

A system and method for setting, controlling, or maintaining a selected taxi speed and route for one or more aircraft equipped with an onboard non-engine powered drive means powering one or more aircraft wheels to move the aircraft during taxi is provided. Taxi speed and/or route can be set, maintained, or controlled by the aircraft pilot or ground traffic control in conjunction with taxi speed and travel of other aircraft and ground vehicles. A pilot activates a speed control to set and control taxi speed. The aircraft will automatically travel on the ground at that speed without input from the pilot until it is necessary to change the speed manually or automatically. Airport ground traffic control can generate taxi profiles for all non-engine driven aircraft to automatically control, subject to pilot capability to override, the taxi of multiple aircraft at an airport in conjunction with ground vehicle movement.

11 Claims, 2 Drawing Sheets

(56) References Cited

U.S. PATENT DOCUMENTS

| | | | |
|---|---|---|---|
| 7,445,178 B2* | 11/2008 | McCoskey et al. | 244/50 |
| 7,469,858 B2 | 12/2008 | Edelson | |
| 7,975,960 B2* | 7/2011 | Cox et al. | 244/50 |
| 7,983,804 B2* | 7/2011 | Cox et al. | 701/3 |
| 8,220,740 B2* | 7/2012 | Cox et al. | 244/103 R |
| 8,474,749 B2* | 7/2013 | Cros et al. | 244/50 |
| 8,517,303 B2* | 8/2013 | Dilmaghani et al. | 244/50 |
| 8,626,392 B2* | 1/2014 | Kojo | 701/41 |
| 2006/0273686 A1 | 12/2006 | Edelson et al. | |
| 2008/0147252 A1 | 6/2008 | Bayer | |
| 2009/0294577 A1 | 12/2009 | Roques et al. | |

* cited by examiner

SYSTEM AND METHOD FOR MAINTAINING AIRCRAFT GROUND TRAVEL SPEED AND DIRECTION

PRIORITY CLAIM

This application claims priority from U.S. Provisional Application No. 61/530,925 filed 2 Sep. 2011, the disclosure of which is fully incorporated herein.

TECHNICAL FIELD

The present invention relates generally to aircraft ground travel and specifically to a system and method for maintaining a selected ground speed and travel direction during aircraft ground travel.

BACKGROUND OF THE INVENTION

The operation of airlines and airports today focuses on achieving maximum efficiency to keep operating costs as low as possible while continuing to provide travelers with a safe and economical mode of travel. Moving aircraft effectively on the ground between landing and takeoff improves airport operating efficiency. The increased aircraft ground traffic found at many airports, however, may be accompanied by an increased risk of ground incidents involving aircraft, ground vehicles, and even passengers and ground personnel. Improving the efficiency of airport ground traffic should not be at the expense of increased ground safety risks. Effective airport surface traffic management is a critical aspect of maintaining efficient aircraft ground movement in the congested runways, taxiways, and ramps in today's airports. Air traffic control and ground control personnel try to keep ground traffic moving so aircraft can take off on time and delays are minimized.

Runway and ramp congestion caused by increasing numbers of flights, stringent aircraft scheduling requirements, and efforts to squeeze large jets into gates originally designed for much smaller aircraft all contribute to airport traffic jams and reduced maneuvering space in the ramp area. Some studies have indicated that the location of most of the incidents resulting in damage that occur during aircraft ground travel happen at the ramp entry or exit area. At this location, taxi lines leading into and out of the gate area converge, and an aircraft is less likely to be in communication with ground traffic or other controllers. Increased pilot and cockpit crew situational awareness is required in these situations.

Once an aircraft has landed, a pilot currently must use the aircraft engines to power the aircraft from the landing runway to its ultimate parking location at a gate or elsewhere. During taxi, the ground movement of the aircraft must be carefully controlled, and the pilot is required to maintain positive control of the aircraft's direction and speed of movement. In addition, the pilot must be alert and able to check visually the location and movements of everything else along the aircraft's taxi path. An awareness of other aircraft that are taking off, landing, or taxiing and consideration of the right of way of others is essential to safe aircraft ground movement in today's congested airports. To be able to maintain the high level of situational awareness required for safe taxiing, a pilot must be able to keep his or her eyes on the aircraft's exterior environment rather than in the cockpit. This is difficult to do when a pilot must focus not only on careful operation of the aircraft engines during taxi, but also on the aircraft travel speed as the pilot tries to achieve a required time of arrival at a specified traffic flow point at a busy airport. These challenges are additionally present during taxi-out.

The development of airport surface traffic management systems for ground traffic control is designed to provide optimized taxi clearances that eliminate runway delays, especially runway crossing delays, to enable more efficient use of runways. Pilots using such a system must comply with speed- or time-based requirements to efficiently navigate a taxi route so that the movement of all surface traffic can be coordinated precisely. One study of pilots using a simulation of this type of airport surface traffic management system during taxi-out departure from the ramp area to the runway indicated that pilots had more difficulty maintaining a commanded speed for a long distance and spent a significant amount of time with heads down looking at a speed display. (Bakowski et al, *Proceedings of the Sixteenth International Symposium on Aviation Psychology*, 44-49, Dayton, Ohio, Wright University, 2009) The pilots participating in the study indicated that staying within the commanded speed was not a reasonable requirement and negatively impacted safety by interfering with primary taxi tasks to navigate the aircraft and maintain visual separation from other aircraft and obstacles.

While most airports have recommended taxi speeds during aircraft ground travel after landing and prior to takeoff, it is difficult to set a firm rule that defines a safe taxi speed. What is safe under some conditions may be hazardous under others. A primary requirement for safe taxiing is maintaining safe positive control, which includes the ability to stop or turn where and when desired. Too great a taxi speed must be avoided, since high ground speeds can exert excessive strains on an aircraft and result in a lack of control on turns. Taxi speeds generally may vary from about 10 knots (11.5 miles per hour) to about 20 knots (23 miles per hour), with the lower speed recommended for turns and the higher speed recommended for straight sections of the runway or taxiway. More aggressive operators, typically not in hub airports, may vary taxi speeds from about 15 knots to about 25 knots (17.3 to 28.8 miles per hour).

Systems for controlling aircraft speed during flight have long been available. One such system is described in U.S. Pat. No. 4,490,793 to Miller. These systems operate to control speed by supplying appropriate commands to engine automatic throttle controls to maintain a target speed. Pilots typically control aircraft ground travel speed in much the same way, by varying throttle inputs to the engine to adjust engine operation, thereby regulating the speed of travel of the aircraft on the ground. The use of an aircraft's main engines to move an aircraft on the ground presents challenges, however, ranging from the dangers associated with jet blast and engine ingestion to the reduction in useful engine life caused by ingestion of foreign object debris and continuous engine operation at low taxi speeds rather than optimal air speeds. In addition, aircraft ground travel using the aircraft engines consumes significant amounts of fuel and increases fuel costs.

U.S. Pat. No. 7,469,858 to Edelson, owned in common with the present invention, describes a geared wheel motor design that may be used to move an aircraft during ground travel and taxiing without relying on the aircraft's engines or external tow vehicles. Moving an aircraft on the ground during taxi by means other than the aircraft's main engines or turbines has also been described elsewhere in the art. U.S. Patent Publication No. US2009/0294577 to Rogues et al, for example, describes a device that enables an aircraft to move autonomously on the ground that employs a very specifically defined spiral drive gear to turn an aircraft wheel. It is suggested that the speed of this device can be controlled, but it is not suggested how speed could be controlled or that the direction of travel could be automatically controlled. In U.S. Pat. No. 7,445,178, McCoskey et al describes a powered nose aircraft wheel system useful in a method of taxiing an aircraft that can minimize the assistance needed from tugs and the aircraft engines. A precision guidance system including ground elements that interact with aircraft elements is disclosed for controlling direction of movement of the aircraft on the ground during taxi. McCoskey et al, however, is silent with respect to whether or how the speed or direction of aircraft ground travel could be automatically set, controlled, or maintained. U.S. Pat. No. 7,226,018 to Sullivan also describes a wheel motor useful in an aircraft landing gear wheel designed to provide motive force to an aircraft wheel when electric power is applied. Sullivan also fails to suggest whether or how the speed or direction of aircraft ground travel could be set, controlled, or maintained. U.S. Pat. No. 7,975,960 to Cox et al and U.S. Pat. No. 8,220,740 to Cox et al, owned in common with the present application, describe a nose wheel control apparatus capable of driving a taxiing aircraft without the use of the aircraft main engines or tow vehicles. Controlling and/or maintaining a set aircraft ground travel speed or a direction of travel is not described, however.

Automotive cruise control systems are well known and widely available for setting, controlling, and maintaining a set vehicle travel speed. However, like aircraft autopilot flight speed control systems, speed is controlled by adjusting engine throttle settings in available automotive speed control systems. Although speed control in electric automobiles has been suggested theoretically, there are significant differences and design considerations to be overcome in adapting a theoretical automotive system to drive an aircraft on the ground at a set, maintained taxi speed. Automotive cruise and speed control systems, moreover, do not automatically control direction of travel.

A need exists, therefore, for a system and method for setting a desired aircraft ground speed or direction of travel and automatically maintaining a set ground travel speed or direction for an aircraft equipped with a drive means that powers one or more aircraft wheels to move the aircraft during ground travel without the use of aircraft engines. Such a system and method would overcome the deficiencies of the prior art and permit efficient autonomous aircraft ground travel, leaving a pilot free to focus on taxi tasks other than controlling and/or maintaining the taxi speed required to produce optimum taxi procedures and effective airport surface traffic management.

SUMMARY OF THE INVENTION

It is a primary object of the present invention, therefore, to provide a system and method for setting a desired aircraft ground speed or direction of travel and maintaining a set ground travel speed or travel direction for an aircraft equipped with drive means that powers one or more aircraft wheels to move the aircraft during ground travel without the use of aircraft engines.

It is another object of the present invention to provide a system and method for setting a commanded taxi speed and maintaining the set taxi speed during taxi on an aircraft with at least one drive wheel assembly with a drive means mounted on at least one aircraft wheel that controls movement of the aircraft on the ground independently of the aircraft engines.

It is an additional object of the present invention to provide a speed control for an aircraft equipped with drive means that powers one or more aircraft wheels to move the aircraft during ground travel without the use of aircraft engines that is controllable by the aircraft pilot or by ground traffic control located in an airport tower or other remote location outside the aircraft to maintain a selected speed of ground travel for the aircraft.

It is a further object of the present invention to provide a method for automatically setting a selected aircraft ground travel speed and controlling or maintaining the selected speed during taxi in an aircraft equipped with drive means that powers one or more aircraft wheels to move the aircraft during ground travel without the use of aircraft engines that can be manually changed by the aircraft pilot when necessary.

It is a further object of the present invention to provide a method for automatically controlling the direction of ground travel in an aircraft equipped with drive means that powers one or more aircraft nose wheels to move the aircraft during ground travel without the use of aircraft engines.

It is yet another object of the present invention to provide a system and method for setting, controlling, or maintaining a selected aircraft taxi speed that requires minimal pilot input and leaves the pilot free to concentrate on other aircraft taxi tasks.

It is yet another object of the present invention to provide a system and method for automatically setting, controlling, or maintaining a selected aircraft taxi speed in an aircraft equipped with drive means that powers one or more aircraft nose wheels to move the aircraft during ground travel without the use of aircraft engines that interfaces with sensors located outside the aircraft to automatically guide the aircraft along a selected travel route between landing, arrival at an airport gate, departure from an airport gate, and takeoff.

It is yet an additional object of the present invention to provide a system and method for automatic taxi of an aircraft equipped with one or more onboard non-engine powered drive means that power one or more aircraft nose or main wheels to move the aircraft during taxi.

It is yet a further object of the present invention to provide a system and method for setting, controlling, or maintaining taxi and ground movement profiles for all aircraft at an airport that are equipped with one or more onboard non-engine powered drive means that power one or more aircraft nose or main wheels during taxi, whereby ground traffic control in the airport tower or elsewhere outside the aircraft sets, controls, or maintains aircraft ground movement in conjunction with the ground movement of other vehicles at the airport.

It is a still further object of the present invention to provide a system for setting, controlling, or maintaining a selected aircraft taxi or ground travel speed that can be retrofitted in an existing aircraft.

In accordance with the aforesaid objects, a system and method for setting, controlling, or maintaining a selected aircraft taxi or ground travel speed or direction is provided. The system and method are designed to set, control, and/or maintain a selected taxi speed or taxi direction in an aircraft equipped with an onboard non-engine powered drive means that powers one or more aircraft wheels to move the aircraft in a desired direction during ground travel. Using a speed control located in the flight deck or another convenient location, a pilot can set a desired appropriate ground travel speed and activate the speed control to hold the set speed as long as required during ground travel or taxi. The speed control activates drive means located to power one or more aircraft wheels to move the aircraft at the set speed. Once the desired speed is set, the aircraft will automatically travel on the ground at that speed without input from the pilot until it is necessary to change the aircraft ground speed. The aircraft's speed is changed automatically or manually, as required, and then returns to the desired set speed. Aircraft travel direction can also be automatically controlled by the present system when the aircraft onboard non-engine powered driver that powers one or more steerable nose wheels. The system components are designed to be retrofitted in an existing aircraft to set, control, or maintain aircraft ground travel speed.

The present invention also provides a system and method for setting, controlling, or maintaining a fully automatic taxi profile for a specific aircraft at an airport and/or for each aircraft at the airport equipped with an onboard non-engine powered drive means that powers one or more aircraft wheels to move the aircraft during ground travel. Taxi profiles can be set by ground traffic control in the airport tower or elsewhere outside the aircraft to automatically control the taxi speed and taxi route for each aircraft in conjunction with the movement of other ground vehicles. The automatic settings can be overridden by the aircrafts' pilots if conditions require a variation in taxi speed. Additionally, the present system can be designed to automatically interface with corresponding sensors located outside the aircraft along runways, taxiways, jet ways, and at gates or other parking locations to guide the aircraft along its taxi route.

Other objects and advantages will be apparent from the following description, claims, and drawings.

DESCRIPTION OF THE INVENTION

The system and method of maintaining aircraft ground travel speed of the present invention permits a level of control over aircraft ground travel and taxi not heretofore possible. While autopilot systems that control aircraft travel during flight and leave the pilot and cockpit crew free to handle other flight tasks have long been available, similar systems have not been provided to control aircraft ground travel. When an aircraft touches down on an airport runway, the pilot and cockpit crew must direct the moving aircraft along the airport's runway system to an ultimate parking location. The distance and runway route to be traveled depends on the specific airport and can vary quite widely. Some airports have a limited number of runways that can be easily navigated with few turns or stops, and other airports require the cockpit crew to negotiate a more complex path between landing and arrival at a gate or other parking location. Whether an aircraft's taxi path is simple or convoluted, the pilot and cockpit crew must maintain positive control of the aircraft's speed and direction of movement during taxi while also visually checking the location and movements of everything else along the taxi path. The process is reversed during departure of the aircraft from its parked location to a takeoff runway.

Until the present invention, pilots were required to maintain aircraft ground travel speed within required limits by constantly controlling throttle position on one or more of the aircraft's engines. A combination of nose wheel steering, power application, and braking, including differential braking, is necessary to move and turn an aircraft and control taxi speed in conjunction with operation of the aircraft's engines. As a result, the pilot's and cockpit crew's situational awareness during taxi has not been optimum. The system and method of the present invention enables a pilot and crew to predetermine an optimum taxi speed for a specific airport runway configuration, to set the aircraft for ground movement at the predetermined speed, and to maintain the predetermined aircraft ground speed during taxi independently of the use the aircraft's engines. The pilot and crew are then able to improve their situational awareness during taxi and to direct their focus to the aircraft's exterior environment and to other tasks required to ensure a safe arrival or departure of the aircraft.

The system and method for maintaining ground travel speed of the present invention allows the aircraft's engines to be turned off very shortly after landing and to remain off until shortly before takeoff. Eliminating the use of the aircraft engines during taxi also reduces aircraft fuel consumption and eliminates the jet blast, engine ingestion, noise, and air pollution associated with operation of an aircraft's engines on the ground. A safer and quieter runway and ramp environment is possible. Ground movement of the aircraft is produced instead by the operation of one or more drive means associated with one or more of the aircraft wheels. The drive means are powered independently of the aircraft's engines to cause one or more of the aircraft's wheels to rotate at a desired speed, or at a torque associated with a desired speed, while the aircraft is on the ground, thus providing the power to move the aircraft at the desired speed. Any one or more of an aircraft's wheels, including, for example, one or more nose wheels and/or one or more main wheels, can be powered or driven by a suitable drive means. While a preferred location for a drive means is adjacent to or within an aircraft wheel, drive means locations are not limited. A drive means can be positioned at any location where it can be connected with one or more aircraft wheels to provide the driving power required to move the aircraft wheel or wheels at a desired speed or torque and, hence, the aircraft at a desired speed on the ground. Possible locations for one or more drive means in addition to those within or adjacent to a wheel include, without limitation, on or near the wheel axle, in, on or near a landing gear bay or landing gear component, or any convenient onboard location in, on, or attached to the aircraft.

The term drive means as used herein refers to any non-engine onboard drive means, whether or not located in a wheel, capable of moving an aircraft on the ground. A drive means preferred for use with the system and method of the present invention may be an electric motor or other type of motor, such as, for example a hydraulic pump/motor assembly or a pneumatic motor, that is capable of operating for desired time periods at maximum torque and at cruise torque.

An electric motor preferred for use with the wheel and drive means assembly of the present invention could be any one of a number of designs, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, a permanent magnet brushless motor, a synchronous motor, an asynchronous motor, a pancake motor, a switched reluctance motor, electric induction motor, or any other electric motor geometry or type known in the art is also contemplated to be suitable for use as the drive means of the present invention.

The drive means selected should be able to move an aircraft wheel at a desired speed and torque that are capable of moving an aircraft effectively during ground travel. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. As indicated above, any form of electric motor capable of driving a landing gear wheel to move an aircraft on the ground may also be used. Other motor designs capable of high torque operation across a desired speed range that can move an aircraft wheel to function as described herein may also be suitable for use in the present invention. A particularly preferred motor is a high phase order induction motor with a top tangential speed of about 15,000 linear feet per minute and a maximum rotor speed of about 7200 rpm. With an effective wheel diameter of about 27 inches and an appropriate gear ratio, an optimum top speed of about 28 miles per hour (mph) can be achieved, although it is contemplated that any speed appropriate for aircraft ground travel in a particular runway environment could be achieved.

A drive wheel assembly including a drive means in accordance with the present invention is specifically designed to be retrofitted on existing aircraft without requiring changes to existing wheel structures, including the brakes. A major advantage of the design of the wheel and drive means is achieved by the continued use of the existing tires, axle, and piston already in use on an aircraft. Since these structures are not altered from their original condition or otherwise changed in any way by the installation of the present wheel and drive means assembly, the rim width, tire bead, and bead seat would not require re-certification by the FAA or other authorities, thus eliminating a potentially time consuming and costly process. As a result, the wheel and drive means assembly described herein is especially well suited for installation on existing aircraft. Additionally, the controls required to operate a drive means assembly as described herein can be also retrofitted within the existing cockpit controls.

Figure 1:
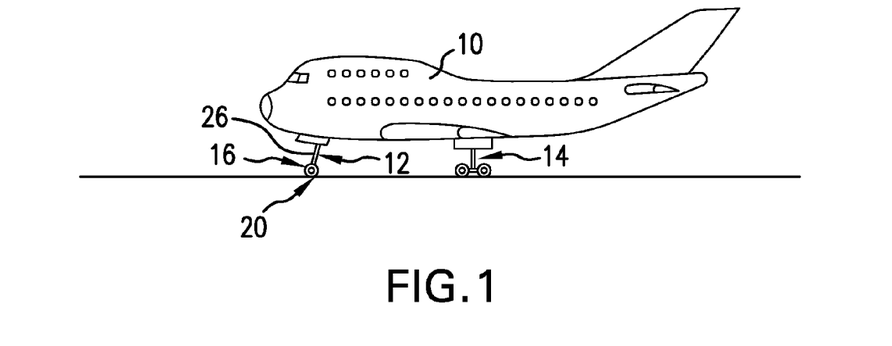
FIG. 1 illustrates an aircraft equipped with a system for maintaining ground travel speed in accordance with the present invention.

Referring to the drawings, FIG. 1 illustrates an aircraft 10 during ground travel. A nose wheel landing gear is shown at 12, and a main landing gear is shown at 14. A drive wheel assembly 16 that includes drive means as described above is shown installed in connection with a nose wheel landing gear 12, but could also be installed in connection with a main wheel landing gear 14. Either or both locations could be appropriate, depending on the specific aircraft application. Additionally, the drive means could be installed in the other locations either in or on the aircraft described above, but not shown in FIG. 1.

Figure 2:
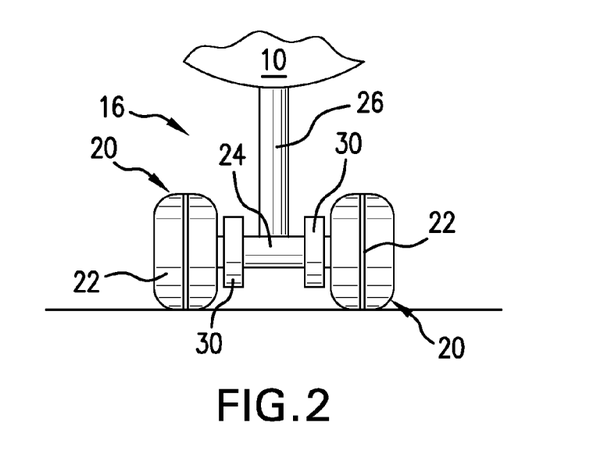
FIG. 2 is a schematic illustration of an aircraft drive wheel with a drive assembly powered by onboard non-engine drive means used to drive an aircraft on the ground in accordance with the present invention.

FIG. 2 illustrates, diagrammatically, one possible arrangement of drive components of a drive wheel assembly 16 mounted in connection with a pair of aircraft drive wheels, either nose wheels or main wheels. The drive wheel assembly 16 of FIG. 2 shows the relative locations of these components. Two wheels 20 with tires 22 are shown rotatably mounted at opposite ends of an axle 24. The axle 24 is mounted on a strut 26 that is connected to the aircraft 10. FIG. 2 shows two drive means 30 of the wheel assembly 16 mounted adjacent to each wheel 20 in driving communication with the wheels and axle 24. As discussed above, this is only one possible drive means location; other drive means locations in, adjacent to, or remote from the aircraft wheel or wheels to be driven are contemplated to be within the scope of the present invention. The system and method of the present invention do not require two drive means 30 to function effectively during taxi. A single wheel drive means 30 can effectively power the aircraft and control speed as described herein. Other numbers of drive means and variations in drive means positions relative to an aircraft nose or main wheel are also contemplated to be within the scope of the present invention.

Moving an aircraft on the ground using a drive wheel assembly and a drive means as described above requires providing sufficient power to the drive means to produce a torque capable of driving an aircraft wheel to move the aircraft at a desired ground speed. Drive means preferred for the present system and method are electric motors. The current, and the voltage and frequency of the current, applied to the motor can be controlled to regulate speed. In an aircraft drive wheel assembly useful in the present invention, current to power the motor preferably originates with the aircraft auxiliary power unit (APU). Other power sources could also be used to supplement or replace the APU as a source of power. These power source can include, for example without limitation, fuel cells, any kind of solar power, POWER CHIPS™, and burn boxes, as well as any other suitable power source for this purpose. Control of the flow of current to the drive means, as well as the voltage and frequency of the current, allows the torque generated by the drive means to be controlled and, therefore, enables control of the speed of the wheel powered by the drive means and the ground travel speed of the aircraft. A motor control system suitable for controlling an onboard electric drive means is described in commonly owned U.S. Patent Publication No. US2008/0147252 to Bayer, the disclosure of which is incorporated herein by reference. The control system described by Bayer includes software that uses a closed loop control in conjunction with other control laws to operate one or more electric motors of the type described above to move an aircraft during taxi. Setting, controlling, and/or maintaining a desired taxi speed is not part of this control system, however.

In an aircraft with one or more drive wheels moving the aircraft, the torque or speed of a wheel drive means must be controlled to move the aircraft a desired taxi speed. It is desirable to be able to set a selected taxi speed and then maintain this selected taxi speed while the wheel drive means is moving the aircraft on the ground between landing and arrival at an airport terminal and between departure from the terminal and takeoff. The selected speed will not necessarily be the same for all aircraft ground travel and will be selected on the basis of such factors as a particular airport's taxi speed limit, weather conditions, the amount, location, and velocities of other ground traffic, and the like.

Setting, controlling, and/or maintaining a desired selected aircraft ground travel speed or direction can be achieved by providing system components, including, for example, a computer-based controller that connects other system components, such as speed sensors, torque sensors, and the like, with one or more wheel drive means to select and set an appropriate ground travel speed and maintain the set speed while the aircraft is traveling on the ground powered by the wheel drive means. Speed and/or torque sensors could be installed in communication with any moving components in the drive means, a rotor, for example, to determine accurate wheel speed. Wheel speed and drive means speed can also be synchronized. The system should also be able to monitor system controls, such as, for example, controls used to set or modify the selected speed, so that the system is aware of the specific ground travel speed set for the aircraft. The monitoring is preferably conducted automatically.

An interface between system components and corresponding sensors located outside the aircraft could be employed to ensure that the aircraft follows a correct taxi route. The activation of the interface and the external sensors, preferably located along runways, taxiways, jetways, and at gates, can automatically guide the aircraft along a programmed taxi route.

When an aircraft is equipped with an onboard non-engine powered drive means assembly in one or more aircraft nose wheels, the present system can be configured to steer the aircraft automatically. Automatic steering for the present system could also be designed to be enabled when an onboard non-engine powered drive means assembly is installed on one or more aircraft main wheels.

The ground travel speed of an aircraft preferably also includes other controls that are similar to those found in automotive cruise control systems. Controls, such as those typically labeled RESUME, SET/ACCEL, and COAST, for example, that can be activated manually or automatically during taxi can be integrated with the present aircraft ground travel speed control system. If the aircraft is no longer traveling at the set speed, for whatever reason, activating the RESUME control will command the system to accelerate back to the most recently set speed. Activating the SET/ACCEL control both maintains the current set speed and allows the pilot to increase the set speed. Activation of the COAST control results in reduced or no wheel torque, which, depending on the surface slope and other conditions, will generally produce a deceleration in speed.

Preferably, an aircraft speed control system in accordance with the present invention allows the aircraft to reach the set speed and maintain the set speed without variation during taxi until conditions occur that require a change in the set speed. The controls described above can be designed to permit the pilot to manually vary the aircraft's speed when conditions may require variation. The conditions relating to aircraft ground travel that require a change in set speed are different from conditions, such as, for example, a change in road grade, that require a change in set speed in an automotive cruise control system. As long as the aircraft's travel path is relatively straight and flat and does not require stops or turns, maintaining a set ground travel speed can be accomplished relatively simply by using sensors (not shown) to monitor wheel speed and/or aircraft ground speed and by modifying the voltage, current, or frequency of the current supplied to the drive means as needed to keep the drive means torque or speed constant. One way to regulate aircraft speed is to control the torque generated by the wheel drive means. If the drive means torque is greater than the aerodynamic drag, rolling resistance, or other forces (resistive torque) acting on the aircraft, the aircraft will accelerate. If the drive means torque is less than resistive torque, however, the aircraft will slow down.

Figure 3:
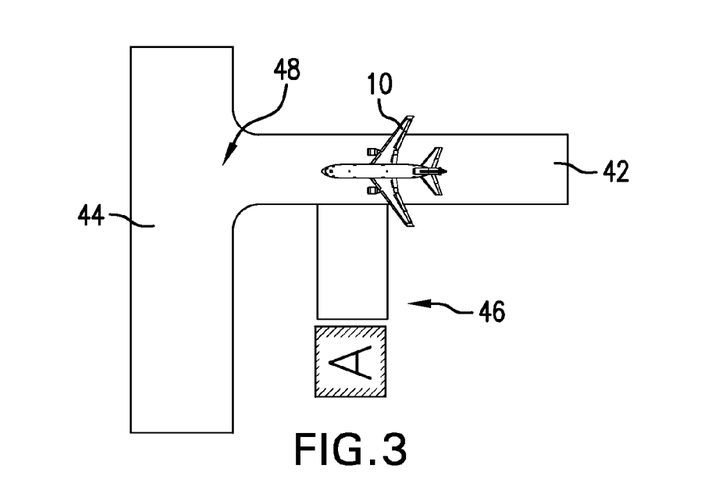
FIG. 3 shows an aircraft at a critical location during ground travel at an airport runway intersection where the system and method of maintaining a set ground speed of the present invention can be automatically adjusted.

FIG. 3 illustrates a runway crossing, one aircraft ground travel condition that will affect the maintenance of a set ground travel speed in an aircraft. Aircraft 10, equipped with at least one drive wheel assembly with a drive means to power ground movement as described above, has traveled along a straight runway 42 at a constantly maintained set speed following landing. Runway 42 intersects with a second runway or taxiway 44, as indicated by a typical runway sign 46. If there are no other aircraft on the ground in the area, aircraft 10 will be required to slow down at the intersection 48 where runways 42 and 44 meet and then turn either right or left, depending on the aircraft's parking destination. The presence of other aircraft on runway 44 will require the aircraft 10 to come to a complete stop prior to turning. This situation could also arise during departure prior to takeoff. The set ground travel speed cannot be safely maintained at the intersection 48, especially in a congested airport. Consequently, the control system of the present invention includes control elements, such as those described above, that can adjust the speed while the aircraft slows or stops at the intersection and turns and then resume the set speed once the aircraft enters the runway 44 where ground travel at the set speed is again appropriate. The pilot and cockpit crew, freed from the need to focus on maintaining the aircraft's speed, can navigate runway crossings more safely than in the past. The pilot and crew additionally have the capability to override the speed control system at any point in the journey.

Preferably, the present speed control and maintenance system includes intelligent software that will automatically adjust the voltage and frequency of the current supplied to the drive means when an aircraft's speed must deviate from the set speed, such as when the aircraft is required to slow or stop, and then further automatically modify the voltage and frequency of the current supplied to the drive means to increase the aircraft's speed to the set speed after the turn has been completed. The relationship between driver torque and resistive torque described above could also be used as a basis for automatically adjusting the voltage and frequency of the current supplied to the drive means. Since the current flowing through the drive means is proportional to the torque produced, aircraft speed can be controlled by controlling voltage and frequency of the current to the drive means. Alternatively, the speed could be reset manually. In this event, manual controls, preferably including the RESUME, SET/ACCEL, and COAST controls described above, would be provided, preferably in the cockpit, or in other suitable locations.

Figure 4:
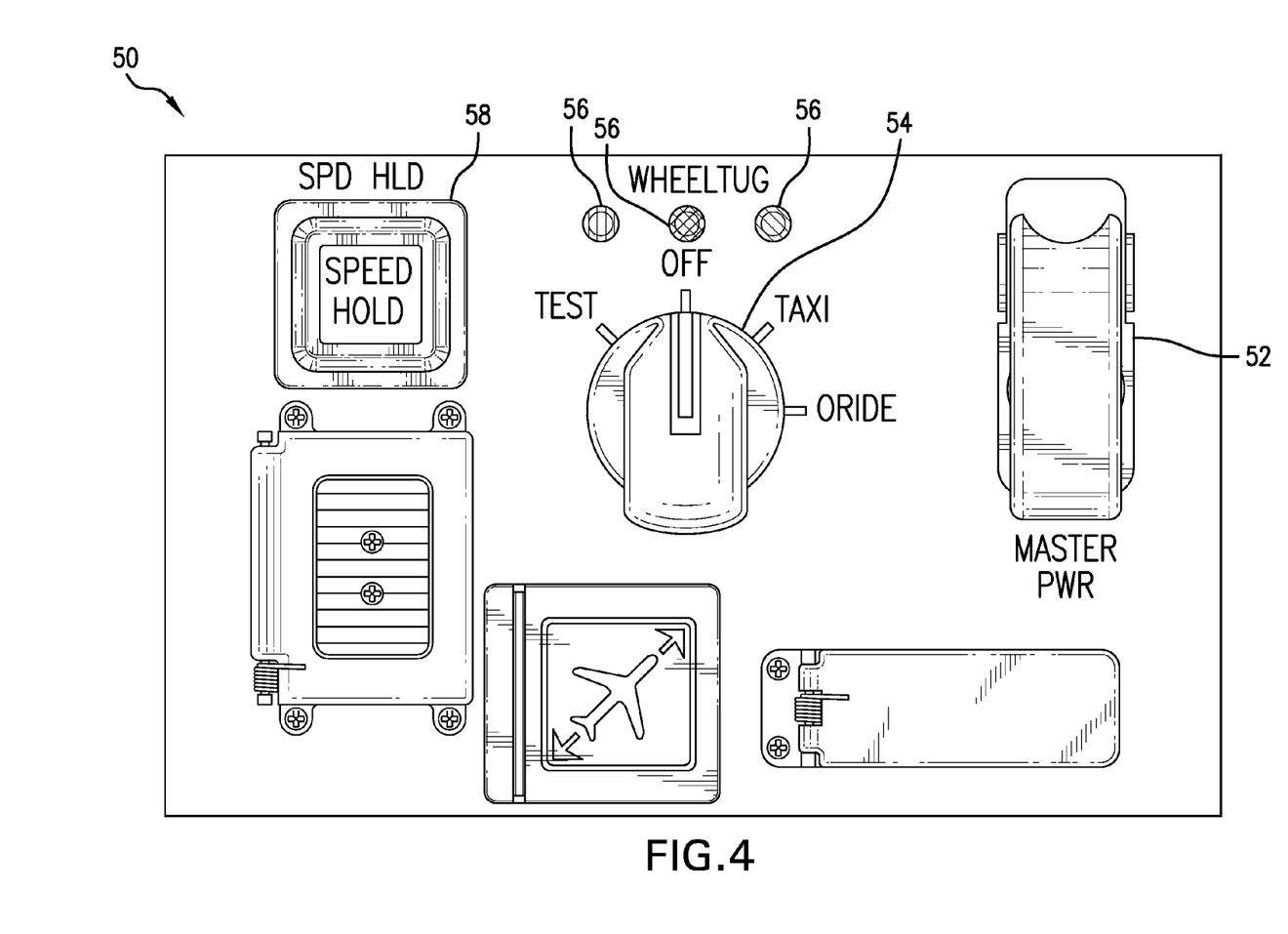
FIG. 4 illustrates one possible configuration of cockpit controls useful with the ground speed control system and method of the present invention.

The system of the present invention preferably includes indicators and controls in the aircraft cockpit. FIG. 4 shows one possible arrangement of controls in a cockpit controls kit 50, which can be added easily to the existing controls in an aircraft cockpit or retrofitted as a set of controls, like that shown in FIG. 4. Other arrangements and configurations of controls are also contemplated to be within the scope of the present invention. The components of the cockpit control kit 50 provide an interface between the pilot and cockpit crew and ground travel speed control and speed maintenance system of the present invention. The cockpit controls kit 50 shown in FIG. 4 includes a master power switch 52, a multiple position wheel drive means switch 54, indicators 56, and a speed hold control 58, which functions as a SET control as described above. Other controls and indicators may also be provided, including but not limited to the RESUME, ACCEL, and COAST controls discussed above.

The master power switch 52 can be activated to access power, preferably from the aircraft's auxiliary power unit (APU), to drive the aircraft on the ground and for other aircraft functions. The multiple position wheel drive means switch 54, shown in the OFF position in FIG. 4, directly powers and controls the operation of one or more wheel drive means, such as wheel drive means 30 in FIG. 2. In the OFF position, the aircraft wheel drive assembly and all of the components of the ground travel system are completely unpowered. In the TEST position, the presence of power is checked. Only selected system components, for example a system microprocessor, and some parasitic components, such as sensors, should be indicated as powered when the switch 54 is turned to the TEST position. In the TAXI position, current flows to one or more wheel drive means to generate the torque required to move the aircraft at a desired ground travel speed. The ORIDE setting is used to override a torque setting in the event that conditions require a torque setting in excess of a predetermined maximum torque. The indicators 56 preferably include red, green, and yellow lights to indicate when the drive means are on or off and when the override setting is in effect. Additional function indicators could also be provided. The speed hold control 58 enables the setting of the desired drive means, wheel, and/or aircraft ground travel speed to be maintained during ground travel. As indicated above, the speed can be set directly or indirectly by setting the torque that corresponds to the desired speed. The set ground travel speed will be maintained until the speed hold control 58 is automatically or manually adjusted. When the aircraft speed is held at a selected taxi speed, any additional commands from the pilot or elsewhere, including braking, will interrupt the speed hold function, just as tapping the an automobile's brakes will disconnect the cruise control in an automobile.

The aircraft speed control and maintenance system of the present invention is activated upon landing and then prior to pushback for takeoff to set a speed to be maintained during taxi when ground travel of the aircraft is powered by one or more wheel drive means. The speed hold control 58 (FIG. 4) is activated to set the desired speed, and the wheel drive means switch 54 is moved to the TEST position and then to the TAXI position to activate the drive means to move the aircraft. Since the aircraft is already moving after landing, it may be necessary to wait to activate the wheel drive means switch 54 until the aircraft has slowed to close to taxi speed. When the aircraft is parked at a gate prior to pushback and takeoff, activation of the wheel drive means switch will be required to start the aircraft's movement. Once the speed hold control is set, the pilot and cockpit crew will be able to concentrate on steering the aircraft and other tasks during taxi. The speed hold control and wheel drive means switch will both be de-activated when an arriving aircraft comes to a complete stop and when a departing aircraft is no longer on the ground.

The system for setting, controlling, or maintaining a selected aircraft ground travel speed of the present invention could also be used to fully automate aircraft taxi following landing and prior to takeoff in conjunction with an aircraft's navigation system for a single specific aircraft or for all aircraft at an airport or airfield equipped with an onboard non-engine powered drive means that powers one or more aircraft wheels to move the aircraft during ground travel. This can be accomplished with the full knowledge of ground traffic control in the tower. Each aircraft's specific position and location on the ground and the route to each aircraft's ultimate destination, whether a parking location at the terminal upon arrival or a runway for takeoff, is communicated to the tower. The aircraft's navigation system identifies the aircraft's location on a runway after landing or at a gate prior to pushback and takeoff. A preset taxi profile for an aircraft at the specific airport where it is located setting the travel route and the taxi speed can be entered into the present system and activated to commence taxi of that aircraft.

A live taxi profile that automatically controls the aircraft taxi route and taxi speed could also be computed by ground traffic control in the tower or elsewhere for that aircraft, as well as for all other aircraft equipped with and capable of using onboard non-engine drive means to power ground movement. Such a taxi profile would account for other ground vehicles at the airport likely to be in the vicinity of the taxi route. An aircraft's taxi profile, whether preset or computed by the tower, can be made available only to the aircraft itself or to the tower and/or all other aircraft at the airport, whether aircraft are on the ground, landing, or taking off. Positions can be computed for each aircraft and, in addition, for each piece of equipment on the ground for a selected time period, from the present time to a future time, two hours out, for example. A preset taxi profile for an aircraft at a specific airport can be set either independently of the tower or in conjunction with all other aircraft and ground vehicles at the airport or in conjunction with only specific aircraft and vehicles or equipment at specific runways, taxiways, or jet ways.

The taxi profile could also be set to use sensors located outside the aircraft, as described above, that interface with the taxi speed management system components to automatically and accurately guide the aircraft along the set taxi route. The system can also, as indicated above, control direction of ground aircraft travel by automatically steering the aircraft as required to follow the taxi route.

The pilot is free to conduct other duties during automatic taxi and retains the capability to override any action related to the aircraft's ground travel that requires override. The present system additionally includes detection devices that automatically detect an actual or potential hazard, such as, for example, the presence of an aircraft or other vehicle that is too close, and communicate the presence of the hazard to the pilot and to the tower and/or other aircraft and ground vehicles as necessary and appropriate. The pilot can then cancel the preset taxi program and manually control the aircraft's ground travel until it is safe to reinstate the automated taxi profile.

While the present invention has been described with respect to preferred embodiments, this is not intended to be limiting, and other arrangements and structures that perform the required functions are contemplated to be within the scope of the present invention.

INDUSTRIAL APPLICABILITY

The system and method of maintaining aircraft ground travel speed or direction of the present invention will find primary applicability when it is desired for an individual aircraft's pilot or ground traffic control to set, control and/or maintain aircraft taxi speed and taxi route in one or more aircraft equipped with one or more drive wheels powered by one or more onboard non-engine powered drive means to move the aircraft on the ground between landing and takeoff in conjunction with other ground vehicles, freeing the pilot and cockpit crew to focus on steering the aircraft and other taxi tasks.

The invention claimed is:

1. A method for setting, controlling, and maintaining a defined taxi speed of an aircraft equipped with onboard non-engine electric drive motors mounted in one or more nose or main landing gear wheels powered to drive the aircraft during taxi without the use of engines and retrofitted with a cockpit controls array kit having a set of components operable to set, control, and maintain the defined aircraft taxi speed, comprising:
   a. retrofitting a cockpit controls array kit within a cockpit of an aircraft powered for ground travel without aircraft engines by electric drive motors mounted in one or more nose or main landing gear wheels, the cockpit controls array kit comprising a set of controls comprising at least a master power switch in activating communication with a source of electric power operating the electric drive motors, a drive motor control system switch in operative communication with a drive motor control system movable between multiple power and control positions comprising at least test, taxi, override, and off positions, a number of visual indicators corresponding to the multiple power and control positions, and a speed hold control switch operable to set and maintain a taxi speed;
   b. defining and generating a taxi profile for ground travel of the aircraft comprising at least a desired taxi speed for airport ground conditions;
   c. activating the master power switch when the aircraft is on the ground after landing or prior to pushback and directing electric power from the source of electric power to the drive motor control system and setting the desired taxi speed to a set taxi speed by activating the speed hold control switch;
   d. checking the presence of electric power in selected drive motor control system components by moving the drive motor control system switch from the off position to the test position and then moving the drive motor control system switch to the taxi position when the presence of power is detected to direct electric current to the electric drive motors and generating a torque required to move the aircraft at the set taxi speed; and
   e. maintaining the set taxi speed when the aircraft is driven by the electric drive motors at the torque required to move the aircraft at the set taxi speed.

2. The method of claim 1, wherein said drive motor control system comprises a plurality of speed controls operable to automatically identify and enter the set taxi speed, and to automatically cause the aircraft to accelerate from a taxi speed lower than the set taxi speed to the set taxi speed, to automatically cause the aircraft to decelerate from a taxi speed higher than the set taxi speed to the set taxi speed, and to automatically cause the aircraft to resume the set taxi speed after the aircraft speed has varied from the set taxi speed.

3. The method of claim 1, wherein said desired taxi speed in said defined and generated taxi profile corresponds to an optimum safe ground travel speed for the aircraft's ground environment.

4. The method of claim 1, further comprising, when the aircraft is taxiing at the set taxi speed and an actual or potential hazard to continued ground travel of said aircraft is detected, automatically communicating said detected actual or potential hazard to said drive motor control system and to one of said visual indicators, and automatically or manually interrupting operation of said drive motor control system to stop ground travel of said aircraft when the visual indicator indicates detection of the actual or potential hazard.

5. The method of claim 1, further comprising:
   a. automatically controlling taxi speed of one or a plurality of aircraft retrofitted with the cockpit controls array kit at a selected airport, electronically generating the defined taxi profile for the desired taxi speed and a selected route of taxi travel between a starting taxi location and an end taxi location as a preset taxi profile for a specific one or more of the one or the plurality of aircraft at said selected airport, and communicating the preset taxi profile to ground control at the selected airport; and
   b. running said preset taxi profile and automatically driving said specific one or more aircraft with said electric drive motors to follow said preset taxi profile until each of said one or more aircraft reaches said end taxi location or the running of said taxi profile program is manually cancelled by a pilot driving said specific one or more aircraft by moving the drive motor control switch to the override position and overriding said preset taxi profile to cancel said preset taxi profile.

6. The method of claim 1, further comprising, when the torque required to move the aircraft at the set speed exceeds a predetermined maximum torque, moving the drive motor control system switch to the override position and continuing to drive the aircraft and while indicating presence of an override condition with one of said visual indicators.

7. The method of claim 1, further comprising interrupting activation of the speed hold control switch and taxi of the aircraft at the set taxi speed by application of a pilot control or aircraft brakes and automatically or manually resetting a taxi speed with the speed hold control switch.

8. The method of claim 1, further comprising programming software for the drive motor control system to automatically activate the speed hold control switch and to automatically adjust the voltage and frequency of electric current supplied to the electric drive motors to set and maintain the desired taxi speed according to an automatically defined and generated taxi profile for a selected aircraft at a selected airport.

9. A cockpit controls array kit to be added to existing cockpit controls or retrofitted in the cockpit of an aircraft equipped with onboard non-engine electric drive motors mounted in one or more nose or main landing gear wheels powered to drive the aircraft during taxi without use of aircraft engines operable to set, control, and maintain a taxi speed defined in a taxi profile for the aircraft during ground travel at an airport, comprising:
   a. a cockpit controls array kit retrofitted within a cockpit of an aircraft powered for ground travel by non-engine electric drive motors mounted in one or more nose or main landing gear wheels comprising an integral set of indicator and control elements in interfacing and operative communication between a pilot or cockpit crew of the aircraft, a non-engine electric drive motor control system, and a source of electric power, wherein said non-engine drive motor control system comprises a computer-based controller, electric drive motor and landing gear wheel speed and torque sensors, and control system software programmed to adjust voltage and frequency of current to the electric drive motors in control communication with the source of electric power operating the electric drive and with said cockpit controls array kit: and
   b. said integral set of indicator and control elements comprises at least a master power switch in activating communication with the source of electric power, a non-engine electric drive motor control system switch movable between multiple power and control positions comprising at least test, taxi, override, and off positions, a number of visual indicators corresponding to at least said multiple power and control positions of said drive motor control system switch, and a speed hold control switch operable automatically or manually to set and maintain or change a taxi speed defined in a taxi profile for the aircraft at an airport where the aircraft is taxiing.

10. The system of claim 9, wherein said non-engine electric drive motors are selected from the group comprising high phase order electric motors, electric induction motors, permanent magnet brushless DC motors, and switched reluctance motors.

11. The cockpit controls array kit of claim 9, wherein said source of electric power comprises an auxiliary power unit on said aircraft, said master power switch is in activating power accessing communication with said source of electric power, said non-engine electric drive motor control system switch is in electric current transmission connection with said non-engine electric drive motors and in electric power indicating communication with said source of electric power.

\* \* \* \* \*